United States Patent
Libbey et al.

(10) Patent No.: US 7,937,468 B2
(45) Date of Patent: May 3, 2011

(54) DETECTING SPAM MESSAGES USING RAPID SENDER REPUTATION FEEDBACK ANALYSIS

(75) Inventors: Miles Libbey, Mountain View, CA (US); F. Randall Farmer, Palo Alto, CA (US); Mohammad Mohsenzadeh, Palo Alto, CA (US); Chip Morningstar, Palo Alto, CA (US); Neal Sample, Santa Cruz, CA (US)

(73) Assignee: Yahoo! Inc., Sunnyvale, CA (US)

( * ) Notice: Subject to any disclaimer, the term of this patent is extended or adjusted under 35 U.S.C. 154(b) by 308 days.

(21) Appl. No.: 11/774,460

(22) Filed: Jul. 6, 2007

(65) Prior Publication Data
US 2009/0013054 A1    Jan. 8, 2009

(51) Int. Cl.
  G06F 15/173    (2006.01)
  G06F 11/00    (2006.01)
  G06F 15/16    (2006.01)
(52) U.S. Cl. ............... 709/225; 726/22; 709/206
(58) Field of Classification Search ............ 726/22; 709/225, 206
See application file for complete search history.

(56) References Cited

U.S. PATENT DOCUMENTS

| | | | | |
|---|---|---|---|---|
| 6,052,709 | A * | 4/2000 | Paul | 709/202 |
| 6,393,465 | B2 * | 5/2002 | Leeds | 709/207 |
| 6,421,709 | B1 * | 7/2002 | McCormick et al. | 709/206 |
| 6,453,327 | B1 * | 9/2002 | Nielsen | 715/205 |
| 6,643,686 | B1 * | 11/2003 | Hall | 709/206 |
| 6,650,890 | B1 * | 11/2003 | Irlam et al. | 455/412.1 |
| 6,772,196 | B1 * | 8/2004 | Kirsch et al. | 709/206 |
| 6,957,259 | B1 * | 10/2005 | Malik | 709/225 |
| 7,181,764 | B2 * | 2/2007 | Zhu et al. | 726/4 |
| 7,315,826 | B1 * | 1/2008 | Guheen et al. | 705/7 |
| 7,373,385 | B2 | 5/2008 | Prakash | |
| 2003/0001890 | A1 | 1/2003 | Brin | |
| 2003/0051026 | A1 * | 3/2003 | Carter et al. | 709/224 |
| 2003/0088627 | A1 * | 5/2003 | Rothwell et al. | 709/206 |
| 2004/0177110 | A1 * | 9/2004 | Rounthwaite et al. | 709/202 |
| 2004/0177120 | A1 | 9/2004 | Kirsch | |
| 2004/0255122 | A1 * | 12/2004 | Ingerman et al. | 713/176 |
| 2005/0091320 | A1 | 4/2005 | Kirsch et al. | |

(Continued)

OTHER PUBLICATIONS

"Bloom Filter," Wikipedia, the free encyclopedia, 7 pgs., http://en.wikipedia.org/wiki/Bloom_filter (accessed May 22, 2007).

Dhamija, Rachna, "Security Skins: Embedded, Unspoofable Security Indicators," Jun. 19, 2006, 57 pgs., Harvard University.

(Continued)

*Primary Examiner* — Firmin Backer
*Assistant Examiner* — Michael A Chambers
(74) *Attorney, Agent, or Firm* — Frommer Lawrence & Haug LLP; Jamie L. Wiegand

(57) ABSTRACT

A network device and method are directed towards detecting and blocking spam within a message by rapidly performing a predication analysis based on early received sender reputation reports. Reputation reports may be received from a plurality of users receiving messages that they interpret as either spam or non-spam. A reputation report rate prediction table is employed to predict the total number of user reports that will occur. The total number of spam reports and not spam (ham) reports for may then be used with a sender categorization model to rapidly predict whether the sender is likely to be a spammer. If the sender is determined to be a spammer, various preventative actions may be taken, including, but not limited to blocking messages from the sender to users, alerting third party filter generators of the spammer, or the like.

20 Claims, 8 Drawing Sheets

U.S. PATENT DOCUMENTS

| | | | |
|---|---|---|---|
| 2005/0097321 A1* | 5/2005 | Zhu et al. | 713/166 |
| 2006/0064755 A1* | 3/2006 | Azadet et al. | 726/24 |
| 2006/0106743 A1* | 5/2006 | Horvitz | 706/21 |
| 2006/0168017 A1* | 7/2006 | Stern et al. | 709/206 |
| 2006/0253578 A1* | 11/2006 | Dixon et al. | 709/225 |
| 2006/0253579 A1* | 11/2006 | Dixon et al. | 709/225 |
| 2006/0253580 A1* | 11/2006 | Dixon et al. | 709/225 |
| 2006/0253581 A1* | 11/2006 | Dixon et al. | 709/225 |
| 2006/0253582 A1* | 11/2006 | Dixon et al. | 709/225 |
| 2006/0253583 A1* | 11/2006 | Dixon et al. | 709/225 |
| 2006/0253584 A1* | 11/2006 | Dixon et al. | 709/225 |
| 2007/0192855 A1* | 8/2007 | Hulten et al. | 726/22 |
| 2007/0214506 A1 | 9/2007 | Rao et al. | |
| 2007/0240217 A1* | 10/2007 | Tuvell et al. | 726/24 |
| 2007/0240218 A1* | 10/2007 | Tuvell et al. | 726/24 |
| 2007/0240219 A1* | 10/2007 | Tuvell et al. | 726/24 |
| 2007/0240220 A1* | 10/2007 | Tuvell et al. | 726/24 |
| 2007/0240221 A1* | 10/2007 | Tuvell et al. | 726/24 |
| 2007/0240222 A1* | 10/2007 | Tuvell et al. | 726/24 |
| 2007/0294281 A1 | 12/2007 | Ward et al. | |
| 2007/0294339 A1 | 12/2007 | Ala-Kleemola et al. | |

OTHER PUBLICATIONS

Dhamija, Rachna et al., "Why Phishing Works," Apr. 2006, 10 pgs.

Dhamija, Rachna et al., "The Battle Against Phishing: Dynamic Security Skins," Jul. 2005, 12 pgs.

Registration Demonstration; Sign-in From New Device; Sign-in Demonstration, 20 pgs., http://passmarksecurity.breezecentral.com/p70238971 (accessed Jun. 13, 2006).

Kristol, D. et al., "HTTP State Management Mechanism," Feb. 1997, 21 pgs., Network Working Group.

Taylor, Bradley, "Sender Reputation in a Large Webmail Service," 6 pgs., Google Inc.

Taylor, Bradley, "Sender Reputation in a Large Webmail Service CEAS 2006," Jul. 27, 2006, 19 pgs., Google Inc.

Office Communication for U.S. Appl. No. 11/945,911, mailed on Sep. 2, 2009.

Final Office Action for U.S. Appl. No. 11/945,911 mailed Apr. 7, 2010, 25 pages.

Advisory Action for U.S. Appl. No. 11/945,911 mailed Jun. 3, 2010, 3 pages.

* cited by examiner

| Bucket | Expected Spam Reports | Expected Ham Reports |
|---|---|---|
| Under 15 minutes | 3.1% | 8.3% |
| Under 30 minutes | 1.8% | 3.2% |
| Under 1 hour | 2.9% | 4.3% |
| Under 2 hours | 4.6% | 5.8% |
| Under 4 hours | 7.1% | 7.7% |
| Over 4 hours | 80% | 70.8% |

DETECTING SPAM MESSAGES USING RAPID SENDER REPUTATION FEEDBACK ANALYSIS

TECHNICAL FIELD

The present invention relates generally to computing security, and more particularly but not exclusively to rapidly detecting and blocking spam based on user feedback about a sender's reputation.

BACKGROUND

The problem of spam in established communication technologies, such as electronic mail, is well-recognized. Spam may include unsolicited messages sent by a computer over a network to a large number of recipients. Spam includes unsolicited commercial messages, but spam has come to be understood more broadly to additionally include unsolicited messages sent to a large number of recipients, and/or to a targeted user or targeted domain, for malicious, disruptive, or abusive purposes, regardless of commercial content. For example, a spammer might send messages in bulk to a particular domain to exhaust its resources.

However, a sender of a large number of messages might not be considered spam. For example, an educational, financial institution, health institution, or the like, might send a large number of messages to its alumni, members, or the like. Similarly, known and/or generally acceptable merchants might send large number of messages that the recipients may actually want to receive. Such bulk message distributors may be well known by its recipients, who may actually seek to receive the messages. Thus, a sender of a large number of messages cannot be classified based solely upon the quantity of messages it sends. Because recipients of the bulk messages may know and accept messages from these senders, filters need to be tuned to allow the messages to be delivered.

Difficulty often arises in algorithmically classifying a sender as a spammer, a reputable source, or somewhere in between. Using today's spam filter approaches, a new spammer might arise, and quickly distribute a large quantity of spam before it can be determined whether the bulk distributions are from a desirable distributor or from an undesirable distributor. Thus, the quicker such a determination can be made, the less likely such bulk messages may become disruptive to its recipients. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Descriptions, which is to be read in association with the accompanying drawings, wherein.

DETAILED DESCRIPTION

Figure 1:
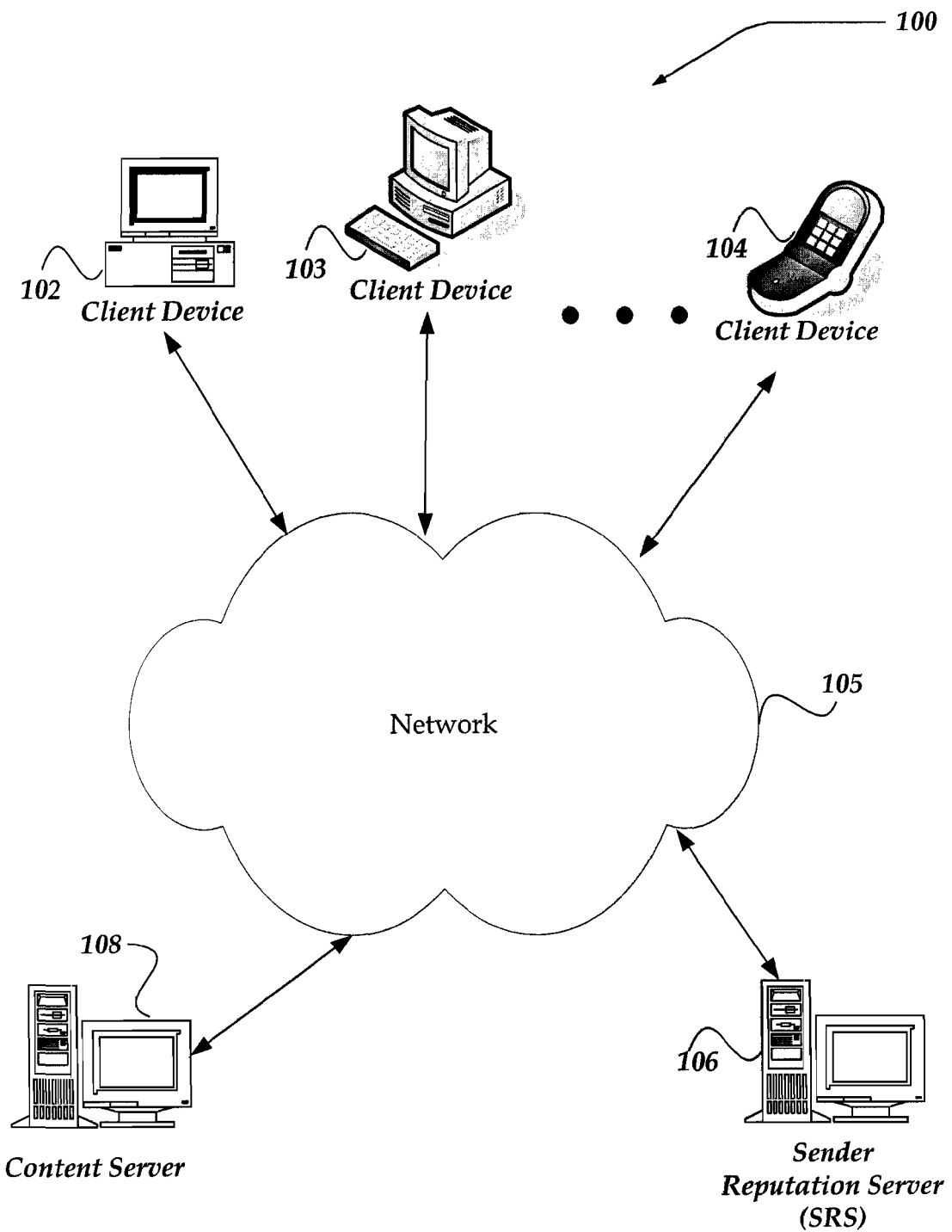
FIG. 1 shows a functional block diagram illustrating one embodiment of an environment for use in managing reputations.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly, the present invention is directed towards detecting and blocking spam within a message by rapidly performing a predication analysis based on early received sender reputation reports. Reputation reports may be received from a plurality of users receiving messages that they interpret as either spam or non-spam. Such reputation reports may be received at a predictable rate. Moreover, based on statistical analysis, delay between deliveries of a message and the user's spam or not spam report to a user appears also to be predictable. Thus, a reputation report rate prediction table can be employed to predict the total number of user reports that will occur. The total number of spam reports and not spam (sometimes called ham) reports for may then be used to quickly categorize a message sender, sometimes taking minutes or seconds instead of hours or days to determine the reputation of the bulk message sender.

The invention therefore is configured to receive spam reports and/or not spam reports over time. As the reports are received, the time of when the reported message was received by a message system and the rating event time are included with other event details. Over a period of time, the reporting patterns may be classified into time buckets—or quickness buckets. A quickness adjustment value may then be determined for the reports and used to predict how many reports are likely to occur about the sender in question. In one embodiment, a karma factor may be employed to adjust a user's report based on how well the user's input might be trusted—e.g., a user's reporting reputation. A sender categorization model may then be used to rapidly predict whether the sender is likely to be a spammer. If the sender is determined to be a spammer, various preventative actions may be taken, including, but not limited to blocking or filtering messages from the sender to users, alerting third party filter generators of the spammer, or the like.

In one embodiment, the invention may be implemented using a real time asynchronous aggregation platform architecture. The platform architecture is designed to capture real time asynchronous events, such as reputation reports on spam and/or not-spam messages, or the like. The events may be passed as input to one or more aggregation engines to be executed upon, and which make results available by querying the platform or by sending real time asynchronous notifications.

It should be noted that while the embodiment of the invention disclosed below is directed towards rapidly determining a reputation for a message sender, the invention is not so limited. For example, the invention may be employed in virtually any application where time to determine a reputation may be relevant. Thus, for example, determining a reputation on a posting of comments to a movie, a blog posting, a play list posting, or the like, may also employ the present invention, with appropriate event collection modifications, and/or data calculations, without departing from the scope of the invention.

Illustrative Environment

FIG. 1 is a functional block diagram illustrating an exemplary operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes client devices 102-104, network 105, content server 108, and Sender Reputation Server (SRS) 106. Client devices 102-104 are in communication with each other, content server 108, and SRS 106 through network 105.

Client devices 102-104 may include virtually any computing device capable of receiving and sending a message over a network, such as network 105, to and from another computing device. The set of such devices described in one embodiment below generally includes computing devices that are usually considered more specialized devices with limited capabilities and typically connect using a wireless communications medium such as cell phones, smart phones, pagers, radio frequency (RF) devices, infrared (IR) devices, Citizen's-Band Radios (CBs), integrated devices combining one or more of the preceding devices, or virtually any mobile device, and the like. However, the set of such devices may also include devices that are usually considered more general purpose devices and typically connect using a wired communications medium at one or more fixed location such as laptop computers, personal computers, multiprocessor systems, microprocessor-based or programmable consumer electronics, network PCs, and the like. Similarly, client devices 102-104 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 102-104 may include an application that enables a user to perform various operations. For example, each client device may include one or more messenger applications that enables the client device to send and receive messages to/from another computing device employing various communication mechanisms, including, but not limited to Short Message Service (SMS), Multimedia Messaging Service (MMS), Instant Messaging (IM), internet relay chat (IRC), Mardam-Bey's internet relay chat (mIRC), Jabber, email, and the like.

In one embodiment, client devices 102-104 may receive messages from a message service, such as might be provided by SRS 106, another network device (not illustrated) or the like. Users of client devices 102-104 may determine that a received message is spam, or not spam (ham). In one embodiment, the user may select to provide such indication that the received message is spam or not spam to another device, such as SRS 106, or the like. Such indications may be performed by clicking on an icon, button, or the like, within or otherwise associated with a messaging client application. In one embodiment, the user might send the indication as another message to SRS 106. Such indications may be referred to a spam or not-spam reputation reports, as they provide a comment on the reputation of the sender of the message.

Client devices 102-104 may be further configured with a browser application that is configured to receive and to send content in a variety of forms, including, but not limited to markup pages, web-based messages, audio files, graphical files, file downloads, applets, scripts, text, and the like. The browser application may be configured to receive and display graphics, text, multimedia, and the like, employing virtually any markup based language, including, but not limited to a Handheld Device Markup Language (HDML), such as Wireless Markup Language (WML), WMLScript, JavaScript, and the like, Standard Generalized Markup Language (SGML), HyperText Markup Language (HTML), Extensible Markup Language (XML).

Network 105 is configured to couple client devices 102-104, with each other, and/or other network devices. Network 105 is enabled to employ any form of computer readable media for communicating information from one electronic device to another. In one embodiment, network 105 is the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G), 4th (4G) generation radio access for cellular systems, Wireless-LAN, Wireless Router (WR) mesh, and the like. Access technologies such as 2G, 3G, and future access networks may enable wide area coverage for network devices, such as client device 204, and the like, with various degrees of mobility. For example, network 105 may enable a radio connection through a radio network access such as Global System for Mobil communication (GSM), General Packet Radio Services (GPRS), Enhanced Data GSM Environment (EDGE), Code Division Multiple Access (CDMA), Wideband Code Division Multiple Access (WCDMA), or the like.

Furthermore, remote computers and other related electronic devices could be remotely connected to either LANs or WANs via a modem and temporary telephone link. In essence, network 105 includes any communication method by which information may travel between client devices 102-104, SRS 106, and/or content server 108.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Content server 108 includes virtually any network computing device that is configured to provide various resources, including content and/or services over network 105. Content server 108 may provide content and/or services for any of a variety of activities, including, but not limited to merchant businesses, financial businesses, insurance businesses, educational, governmental, medical, communication products, and/or services, or virtually any other site of interest. Many of such activities may communicate over the internet using a variety of mechanisms, including, but not limited to email, webpages, IM, SMS, or the like.

Content server 108 may include an interface that may request sensitive information from a user of client devices 102-104. For example, content server 108 may provide access to an account, which may request user log-in information. Such log-in information may include a user name, password, an entry of a key number, or the like. In another example, content server 108 may request other sensitive information, such as a credit card number, medical information, or the like. For example, content server 108 may operate as a merchant site that on at least one webpage of its website, there is a request for entry of sensitive information, including financial information, or the like. In one embodiment, a webpage may include a form, or virtually any other data entry mechanism. Moreover, content server 108 may instead, or in addition to requesting sensitive information from a user, provide one or more web pages that may be associated with an advertisement, blog, or the like, for which a content owner might seek to have a user of client devices 102-104 to be redirected towards. Thus, in at least one embodiment, content server 108 might represent a legitimate content service. However, in another embodiment, content server 108 might represent a phishing site, advertisement site, pornography site, gambling site, or the like.

Furthermore, in one embodiment, content server 108 may be configured to send a message to one or more of client devices 102-104 that includes a link to a web page hosted within content server 108. Moreover, content server 108 may select to send a plurality of messages, bulk messages, or the like, to client devices 102-104, including advertisements, or the like.

In addition, content server 108 may also provide a messaging service, such as a list server, or the like. Thus, users of client devices 102-104 might send a message to a plurality of other users through services provided by content server 108, or the like. In one embodiment, the messages might therefore appear to be sent from content server 108 rather than from the user employing such service. Thus, in one embodiment, content server 108 might operate as a message forwarder, a submit server for an Internet Service Provider (ISP), or the like.

Moreover, content server 108 might be configured to operate behind a proxy server, network address translator (NAT), Enhanced Service Provider (ESP), or the like. In such configurations, an actual network address, such as an Internet Protocol (IP) address, or the like, might not be readily discernable.

Devices that may operate as content server 108 include, but are not limited to personal computers, desktop computers, multiprocessor systems, microprocessor-based or programmable consumer electronics, network PCs, servers, network appliances, and the like.

One embodiment of SRS 106 is described in more detail below in conjunction with FIGS. 2-5. Briefly, however, SRS 106 includes virtually any network device that is configured to receive reputation reports and to statistically predict whether the message sender for which the reputation report describes is likely to be a spammer, or not. Early predication of the reputation of the sender enables SRS 106, or another entity, to inhibit a spammer from delivering spam to protected users. Thus, in real time, as reports are received, a prediction may be made as to the reputation of the message sender which the reports describe. In some instances, a prediction of the reputation of the message sender might be determined within as early as five minutes or so, from a time the reputation reports are received. However, the invention may also, based on the reputation reports, rate of receiving the reputation reports, and a variety of other factors, take more or less time to make a prediction on the reputation of the message sender.

SRS 106 may include a message server that is configured to receive messages and route them to an appropriate client device, or the like. Thus, SRS 106 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, and the like. However, SRS 106 may also include a message server configured and arranged to manage other types of messages, including, but not limited to SMS, MMS, IM, or the like. However, the invention is not so constrained, and another network device may be employed as a message server. In any event, SRS 106 may receive information about a volume of messages received by the message server. Such volume reports may include but are not limited to inbox volume reports, indicating a number of messages received in inboxes associated with users, such as users of client devices 102-104, or the like. SRS 106 may also receive bulk volume reports indicating a volume of bulk messages sent to the users.

SRS 106 may also receive a variety of other reports, including, but not limited to indications of a number of messages that were sent to known 'fake' message recipients. Such fake message recipients, known sometimes as honeypots, are associated with message addresses unassigned to an actual user. These addresses may have been configured for the purpose of detecting spam messages. Thus, in one embodiment, honeypot hits indicate spammer messages.

SRS 106 may also receive a variety of other reports, including, for example, address book entry information indicating whether the message sender is in the recipient's address book. Such information may indicate, for example, that although the message sender is sending bulk messages, the recipient knows the sender, and therefore is likely to want to receive the sender's messages. SRS 106 may also receive a variety of other spam/not spam attribute reports. For example, one such attribute report might include whether the message was sent to an invalid recipient—such as an invalid mailing address, or the like. Such information may indicate that the message sender, for example, is attempting to guess recipients' addresses. However, such information may also indicate that the message sender mistyped a mailing address. Thus, SRS 106 may examine additional information to determine a category in which to place such attribute information. In any event, SRS 106 may receive and employ a variety of reports to rapidly predict and respond to spamming activities.

Although SRS 106 is illustrated as a distinct network device, the invention is not so limited. For example, a plurality of network devices may be configured to perform the operational aspects of SRS 106. For example, in one embodiment, the rapid spam detection may be performed within one or more network devices, while the message server aspects may be performed within one or more other network devices. In any event, devices that may operate as SRS 106 include, but are not limited to personal computers, desktop computers, multiprocessor systems, microprocessor-based or programmable consumer electronics, network PCs, servers, network appliances, and the like.

Illustrative Server Environment

Figure 2:
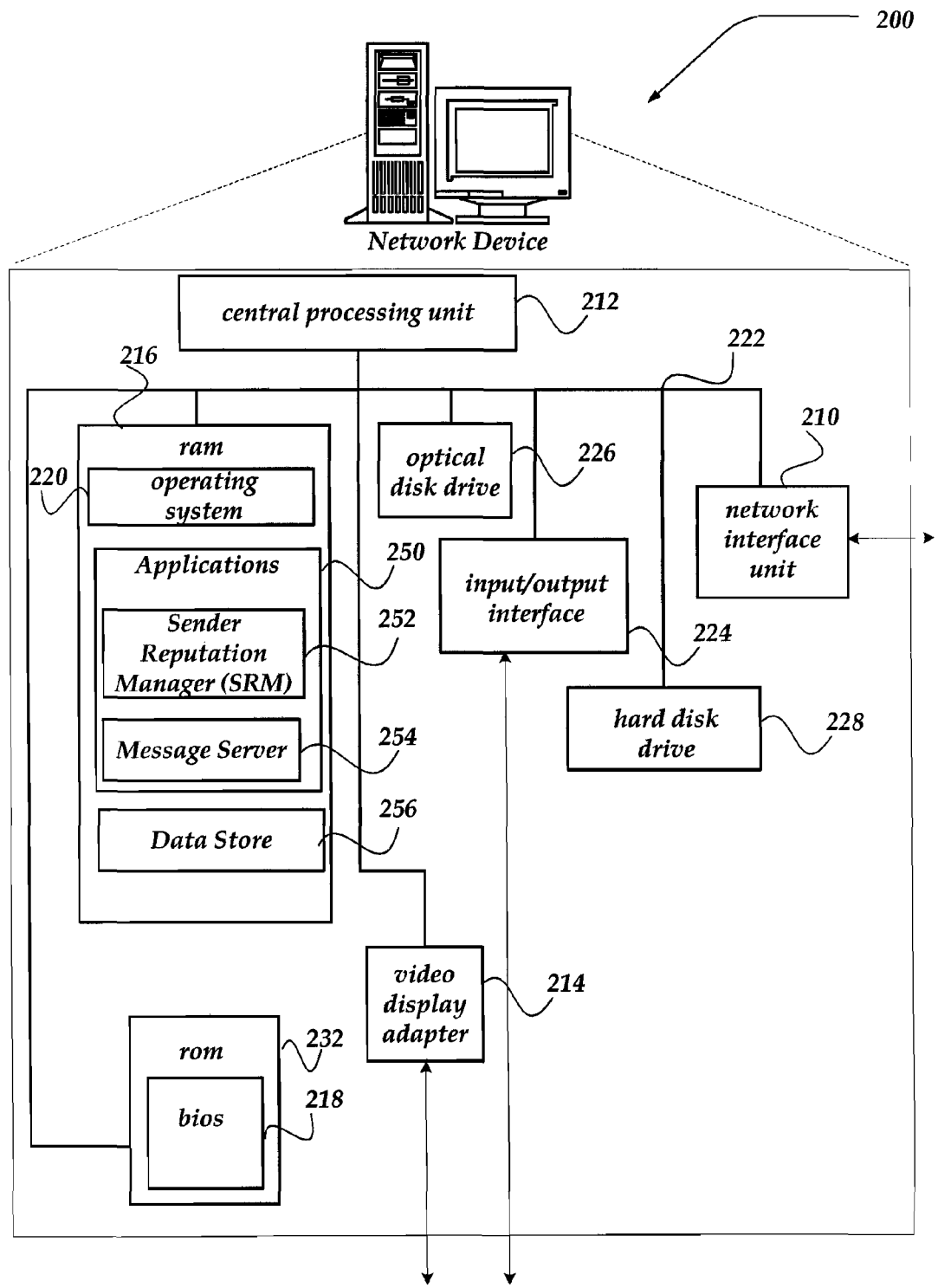
FIG. 2 shows one embodiment of a network device that may be employed within the environment illustrated in FIG. 1.

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may, for example, represent SRS 106 of FIG. 1.

Network device 200 includes processing unit 212, video display adapter 214, and a mass memory, all in communication with each other via bus 222. The memory generally includes RAM 216, and ROM 232. Network device 200 also includes one or more mass storage devices, such as hard disk drive 228, tape drive, optical disk drive, and/or floppy disk drive. The memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, network interface card (NIC), or the like.

Network device 200 may also include an SMTP handler application for transmitting and receiving email. Network device 200 may also include an HTTP handler application for receiving and handing HTTP requests, and an HTTPS handler application for handling secure connections. The HTTPS handler application may initiate communication with an external application in a secure fashion.

Network device 200 also may include input/output interface 224 for communicating with external devices, such as a mouse, keyboard, scanner, or other input devices not shown in FIG. 2. Likewise, network device 200 may further include additional mass storage facilities such as optical disk drive 226 and hard disk drive 228. Hard disk drive 228 is utilized by network device 400 to store, among other things, application programs, databases, or the like.

The memory and/or mass storage as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The memory also stores program code and data. One or more applications 250 are loaded into memory and run on operating system 220. Examples of application programs include schedulers, calendars, transcoders, database programs, word processing programs, spreadsheet programs, security programs, web servers, and so forth. Mass storage may further include applications such message server 254, Sender Reputation Manager (SRM) 252, and data store 256.

Data store 256 is configured and arranged to store and otherwise manage messages, statistical data, reputation reports, volume reports, or the like. Data store 256, however, is not limited to managing storage of these example items, and other items, data, information, or the like, may also be stored within data store 256, without departing from the scope of the invention. For example, data store 256 may also include user account information, policies, procedures or the like, usable for inhibiting delivery of spam. Moreover, data store 256 may be employed to maintain historical data, such as predictions, reputation reports, and the like, usable to generate a reputation report rate prediction table, a sender categorization model, or the like. Data store 256 may also be configured to store the reputation report rate prediction table and/or the sender categorization model. Data store 256 may be implemented using a variety of technologies, including, but not limited to, folders, spreadsheets, data bases, scripts, applications, or the like.

Message server 254 may include virtually any computing component or components configured and arranged to forward messages from message user agents, and/or other message servers, or to deliver messages to a local message store, such as data store 256, or the like. Thus, message server 254 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, or the like.

However, message server 254 is not constrained to email messages, and other messaging protocols may also be managed by one or more components of message server 254.

Thus, message server 254 may also be configured to manage SMS messages, IM, MMS, IRC, mIRC, or any of a variety of other message types.

In any event, message server 254 may be configured to provide reports to SRM 252 indicating various information about messages. Such reports may include information about a volume of messages received by users of message server 254, a volume of determined bulk messages received, information about messages received by known fake message addresses (honeypot reports), Address book entries, or the like.

SRM 252 is configured and arranged to receive input from a community of users that include statements about messages that they have received. SRM 252 may employ, in part, the received statements, which may be in the form of spam and/or not spam and/or other reputation reports, and quickly predicts whether the messages that the users received are likely to be from a spammer. SRM 252 may then enable a preventative action to be performed to inhibit future messages to be received by the community of users from the determined spammer, or to take some other action.

SRM 252 receives the reputation reports, inclusive of any spam and/or not spam reports, and determines which time bucket they are to be associated with. SRM 252 may determine the number of time buckets based on an analysis of historical reporting data. An estimate of percentage of expected spam and not spam reports may be associated with each time bucket, based on the analysis of historical reporting data. It should be noted that the number of buckets, range of time (width) of each bucket, and/or percentage of expected reports within the time bucket may vary over time based on changes in the historical reporting data, number of acceptable false-positives, or the like. One embodiment of a reputation report rate prediction table that employs time buckets is described in more detail below in conjunction with FIG. 6.

SRM 252 may employ the percentage of expected reports to determine a quickness adjustment multiplier (QAM) that may then be used to predict a likely total number of percent spam and/or percent not spam reports that may be received about the message sender of interest. In one embodiment, SRM 252 may also employ information about a user sending a reputation report, to determine how much to trust the user's input. In one embodiment, SRM 252 may use such user reputation information to weight the user's input. The weighted user's input may then be used to determine a karma quickness adjustment multiplier (KQAM), in one embodiment.

SRM 252 may further receive a variety of other information from a various other sources, including reporting volume information, bulk message volume information, honeypot hit reports, or the like. As described above, such information received by SRM 252 may be referred to generally as events. SRM 252 then employs such event information to predict whether the bulk message sender described by the reputation reports is likely to be a spammer. In one embodiment, SRM 252 may determine that insufficient information has been received at a particular period of time to make such a determination. As such, SRM 252 may reserve determination until additional information has been received. In one embodiment, SRM 252 may determine that the bulk message sender's network address is indeterminate, such as might arise when the message sender resides behind a forwarder device, a proxy device, NAT device, ESP, or the like. In such situations, SRM 252 may select to continue to collect reports before making a prediction, or elect to predict whether the message sender is a spammer, legitimate sender, or the like, based on additional information. It should be noted therefore, that SRM 252 is configured to change a prediction for a message sender over time based on additionally received reputation reports from the community of users, and/or other received information. SRM 252 may employ a process substantially similar to that described below in conjunction with FIG. 8 to perform at least some of its actions. Moreover, one implementation of SRM 252 is described in more detail below in conjunction with FIG. 5.

It should be noted however, the SRM 252 is not limited to being implemented within a single network device, such as is illustrated in FIG. 2. Thus, for example, as described below, components of SRM 252 may be distributed across a plurality of network devices, without departing from the scope of the invention.

Illustrative Aggregation Platform for Spammer Detection

Figure 3:
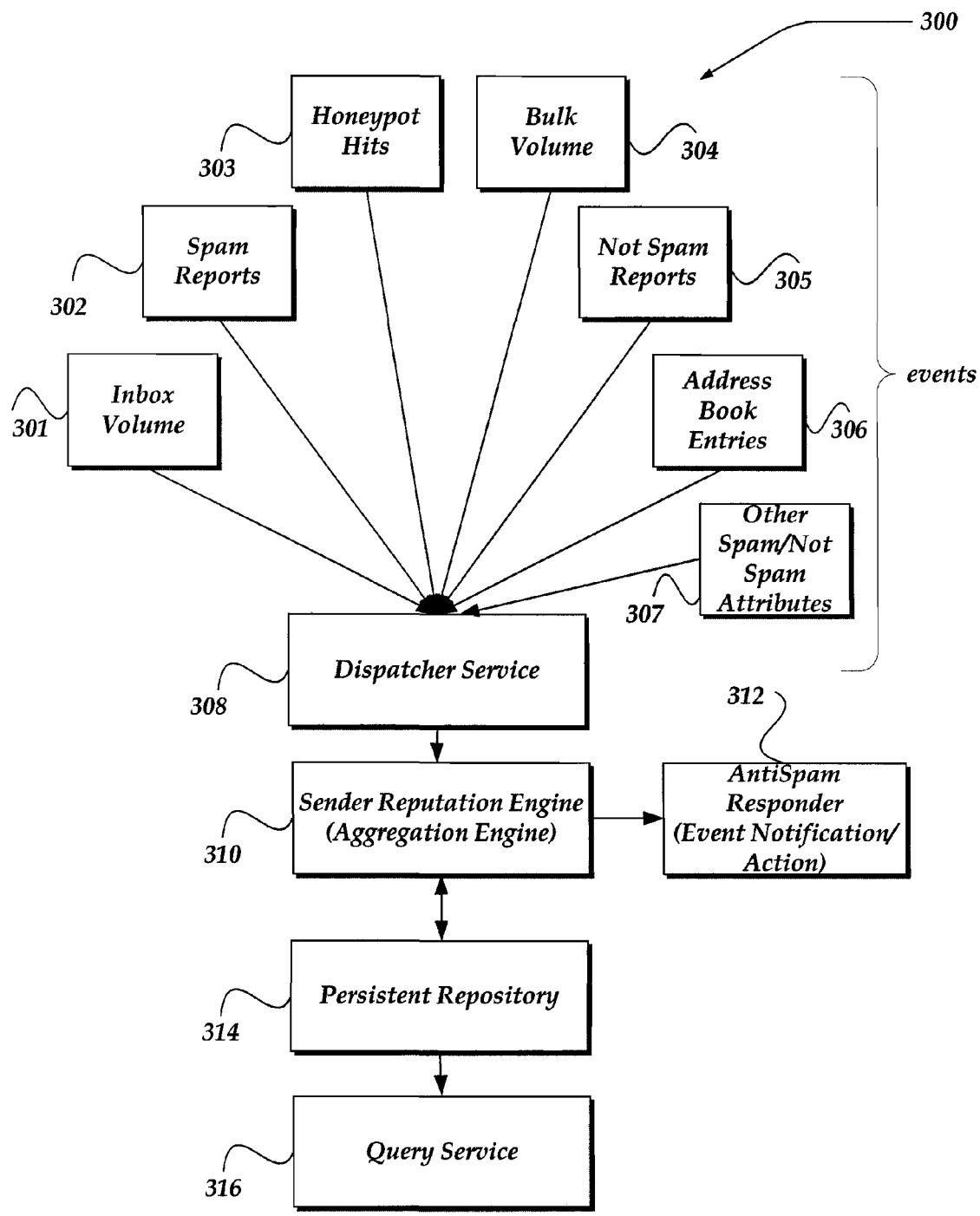
FIG. 3 shows a functional block diagram of one embodiment of a real time asynchronous aggregation platform usable for rapidly determining sender reputations for detecting spam messages usable within the environment illustrated in FIG. 1.

The following describes one embodiment of an implementation of the sender reputation invention using a real time asynchronous aggregation platform. It is noted that the invention is not limited to using such implementation platform, however. Thus, virtually any other implementation may be employed instead. As disclosed, however, FIG. 3 shows a functional block diagram of one embodiment of a real time asynchronous aggregation platform usable for rapidly determining sender reputations for detecting spam messages within the environment illustrated in FIG. 1. Moreover, in one embodiment, platform 300 may be usable, as one embodiment, of SRM 252 of FIG. 2. Platform 300 may include many more or less components than those shown. The components shown, however, are sufficient to disclose an illustrative embodiment for practicing the invention. It should also be noted that the various components of platform 300 may be implemented within one network device, or be distributed across a plurality of network devices. It should also be noted, that while the components illustrated with FIG. 3 appear to show components as single components, the invention is not so limited. Thus, for example, although not illustrated, the persistent repository 314 of FIG. 3 may actually represent a plurality of persistent repositories. Similarly, sender reputation engine (aggregation engine) 310 may represent a single or a plurality of aggregation engines, and so forth with other components illustrated in FIG. 3.

As shown, platform 300 is designed to capture real time asynchronous events, pass them as input to one or more aggregation engines to be executed, and make results available by querying the platform or by sending real time asynchronous notifications. Platform 300 therefore, is configured to lend itself to a variety of other applications where events are viewable as reputation events, usually specifying a source, context, target, and/or claim.

As seen in FIG. 3, the platform includes events 301-307, dispatcher service 308, sender reputation engine (aggregation engine) 310, persistent repository 314, query service 316, and antispam responder (event notification/action) 312.

Events 301-307 represent real time inputs into platform 300. They can be triggered explicitly by users, or triggered implicitly based on some action. They can also be triggered internally by a model within the platform, such as by sender reputation engine 310, or antispam responder (event notification/action) 312, or the like. In one embodiment, the events can be sent to the same deployment, a remote deployment, or to a defined application. Events may be asynchronous in nature, which means that they may be sent by another device, and forgotten; indicating that, in one embodiment, platform 300 might not provide a response when receiving an event.

In one embodiment, the events may be specified using JavaScript Object Notation (JSON), however, the invention is not so constrained, and other specifications may also be employed. Events 301-307 may also be self-describing, being defined by the model application. Thus, each application model may define its own set of events. For example, as shown, events 301-307 represent inputs from a variety of sources, including but not limited to users (e.g., spam reports 302, and not spam reports 305), a message server or the like (e.g., inbox volume 301, honeypot hits 303, bulk volume 304), or a variety of other sources (e.g., Address book entries 306, other spam/not spam attributes 307).

In one embodiment, events 301-307 may include a name of the associated aggregation engine, a method within the aggregation engine that the event is destined for, aggregation engine specific parameters, or the like.

Platform 300 may enable multiple transport protocols for receiving events 301-307. Thus, events 301-307 may be received over an asynchronous transaction stream (such as a reliable store and forward mechanism), or via an asynchronous buffered transport (that may be an unreliable mechanism) over HTTP using a web service, or virtually any other transport protocols, including mail protocols, TCP/IP, or the like.

Sender Reputation Engine 310 is described in more detail below in conjunction with FIG. 5. Briefly, however, Sender Reputation Engine 310 is configured to process incoming events to rapidly predict a message sender's reputation. In one embodiment, sender reputation engine 310 provides a sender classification that may be used to determine whether the sender is likely to be a spammer. Such determination may then be sent as a notification to antispam responder 312. Antispam responder 312 may then, based on the notification, perform some action, such as blocking future messages from the sender, or the like.

Persistent Repository 314 is configured to implement, in one embodiment, a high performance, redundant and scalable data store. Sender Reputation Engine 310 may employ persistent repository 314 to persist data across multiple invocations of Sender Reputation Engine 310, or for sharing data between different aggregation engines.

In one embodiment, persistent repository 314 may be a partitioned, hashed key-value pair repository, using a primary key indexing scheme. However, for other queries, such as those using a secondary index, persistent repository 314 may, in one embodiment, provide a mechanism to send events to other external data stores.

Persistent repository 314 may be configured to scale horizontally by adding more partitions (such as through additional servers, for example), and to enable automatic migration of data from one partition to another partition. In one embodiment, the hashing algorithm may be configured to minimize the amount of migrations. Moreover, the partitions may be fully redundant by employing multiple servers per partition, and ensuring automatic replication of data between the servers.

In one embodiment, persistent repository 314 may use a domain to partition a target namespace. Moreover, in one embodiment, persistent repository 314 may append the target name to the domain to construct the primary key. Thus, in one embodiment, a domain/target may be employed as a unique identifier for storing attributes for a given target in a given domain namespace.

Notifications, such as a sender classification as spammer, may be considered as an outgoing event generated by aggregation engines, such as sender reputation engine 310. Such notifications may be sent asynchronously to notify another application, such as antispam responder 312, or the like, when a change of state occurs. Moreover, notifications can be used to populate a secondary data store, such as one usable to maintain a record of known spammers, or the like.

Query service 316 is configured and arranged to enable an administrator, user, or the like, to request specific information from persistent repository 314. In one embodiment, the query may employ REpresentation State Transfer for distributed hypermedia (RESTful) formats, while a response may be returned as JSON. However, the invention is not limited to these formats, and others may also be used, without departing from the scope of the invention.

Dispatcher service 308 is described in more detail below in conjunction with FIG. 4. Briefly, however, dispatcher service 308 is configured to receive incoming events, and to dispatch them to one or more aggregation engines to be processed. Dispatcher service 308 may, in one embodiment, employ a store and forward transactional mechanism to send events to an aggregation engine.

Dispatcher service 308 may support a variety of transports for incoming events, including reliable transactional transports, batch transports, HTTP via REST or SOAP formats, raw TCP, or UDP message formats, or the like.

Figure 4:
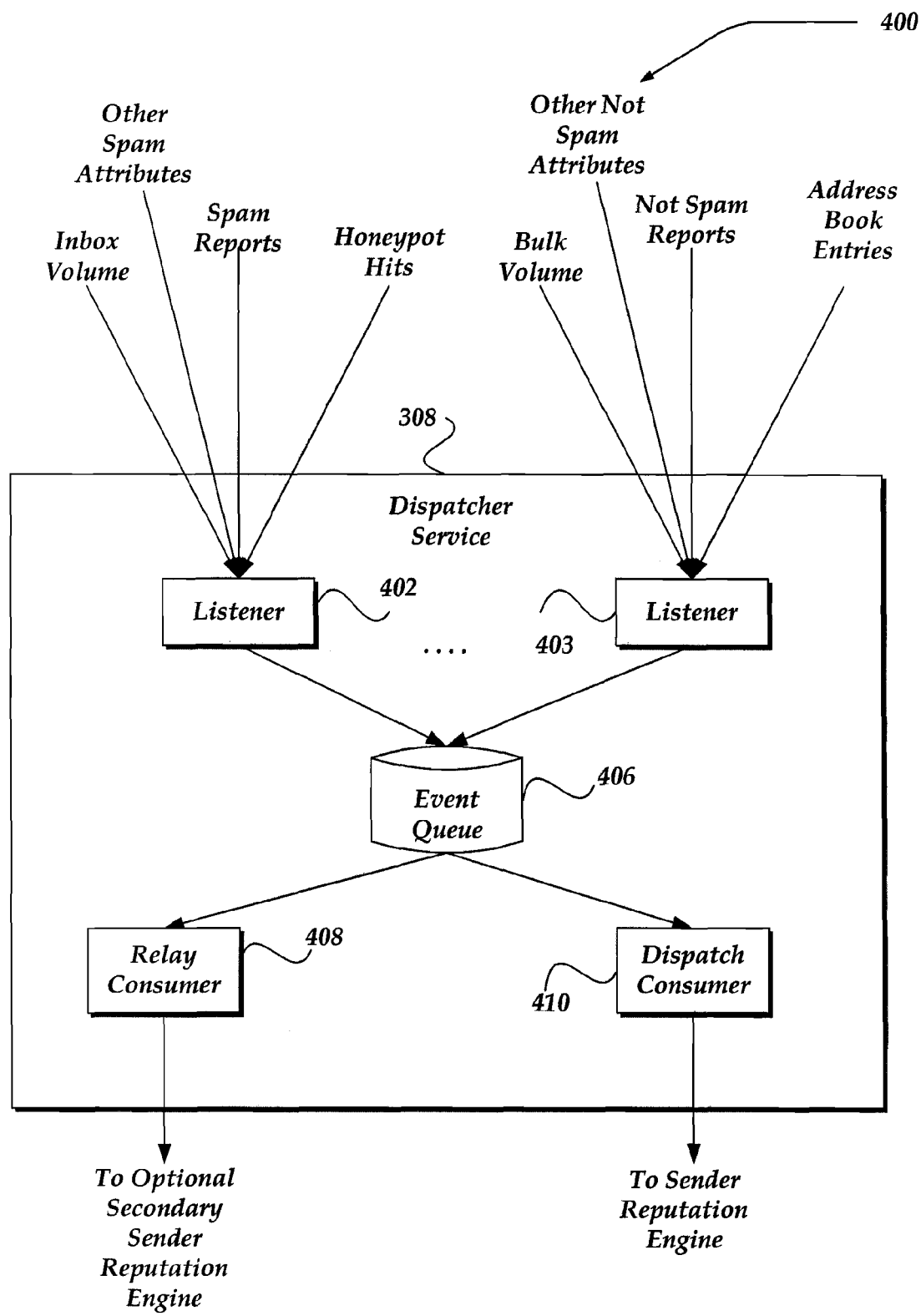
FIG. 4 shows a functional block diagram of one embodiment of an event dispatcher component usable within the real time asynchronous aggregation platform illustrated in FIG. 3.

FIG. 4 shows a functional block diagram of one embodiment 400 of an event dispatcher component usable within the real time asynchronous aggregation platform illustrated in FIG. 3. Dispatcher 308 of FIG. 4 may include many more or less components than those shown. The components shown, however, are sufficient to disclose an illustrative embodiment for practicing the invention.

As shown, dispatcher 308 may include listeners 402-403, event queue 406, relay consumer 408, and dispatch consumer 410. As events are received, one or more listeners 402-403 may receive the events. Such listeners may be configured to listen for incoming events from a particular source, from a particular transport mechanism, or even for a particular type of event. As shown, listener 402 may be configured to receive incoming events, associated with, for example, spam reports, inbox volumes, honeypot hits, or the like. Similarly, listener 403 may be configured to receive incoming events associated with, for example, not spam reports, bulk volumes, Address book entries, or the like. However, the invention is not so limited, and other implementations may be used. For example, a separate listener may be employed for each event. In another embodiment, a listener might be associated with events from a user, such as spam reports, not spam reports, or the like, while another listener is configured to receive reports from a message server, or the like. In one embodiment, events may be time stamped as to when they are received. The events may also be stamped as to a source from which the event is received, or the like. In one embodiment listeners 402-403 may perform such stamping; however, event queue 406 may also be configured to perform such stamping.

In any event, independent of how the incoming events are received, listeners 402-403 may then provide the events to event queue 406, where they may be consumed by consumer process 408 to be delivered to an optional secondary sender reputation engine, or other aggregation engine. Similarly, the events in event queue 406 may also be consumed by dispatch consumer 410 which delivers the events to sender reputation engine 310 of FIG. 3.

Figure 5:
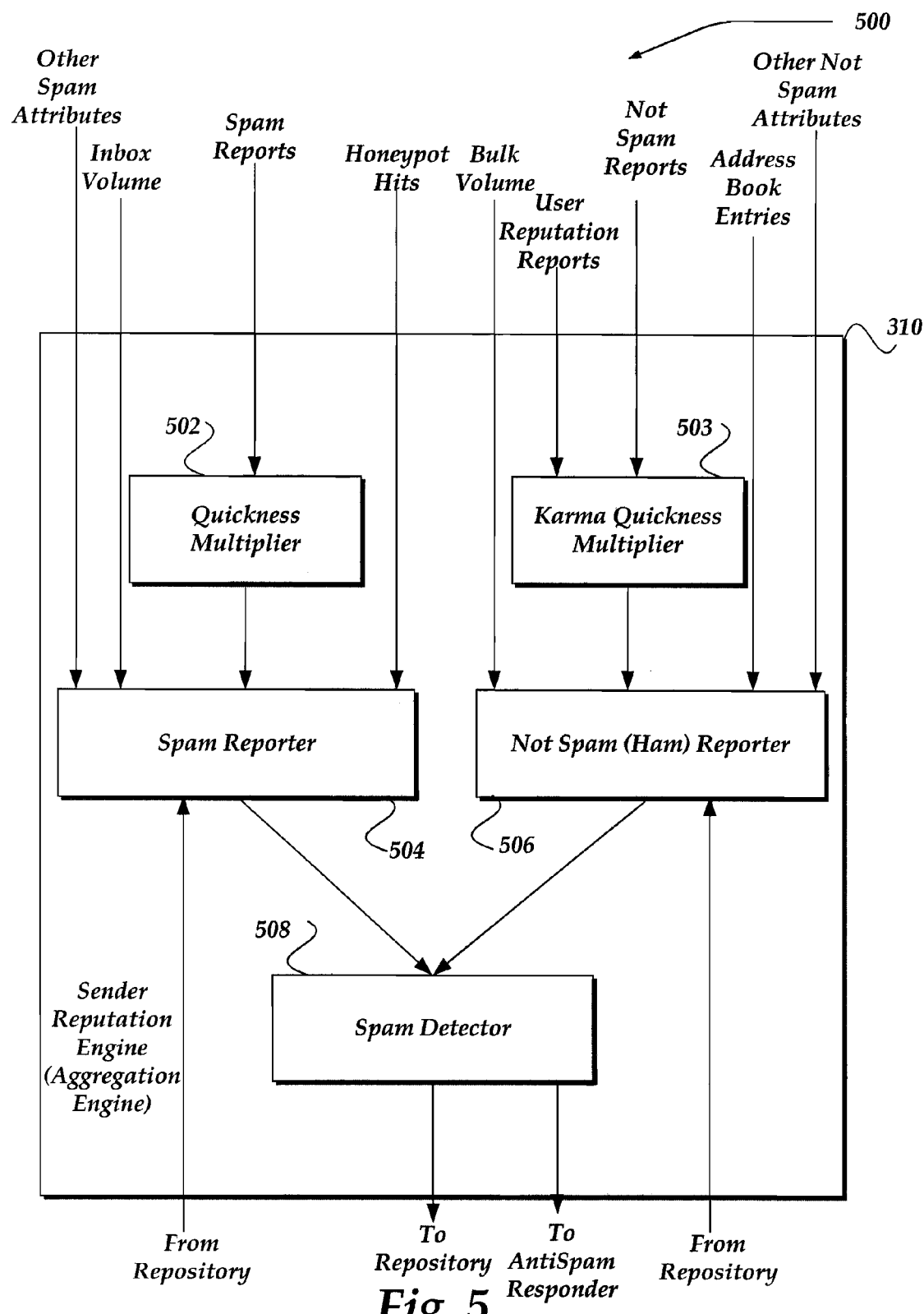
FIG. 5 shows a functional block diagram of one embodiment of a sender reputation engine component usable within the real time asynchronous aggregation platform illustrated in FIG. 3.

FIG. 5 shows a functional block diagram 500 of one embodiment of a sender reputation engine component usable within the real time asynchronous aggregation platform illustrated in FIG. 3. Sender reputation engine 310 may include many more or less components than those shown. The components shown, however, are sufficient to disclose an illustrative embodiment for practicing the invention. However, as illustrated in diagram 500, sender reputation engine 310 includes quickness multiplier 502, karma quickness multiplier 503, spam reporter 504, not spam (ham) reporter 506, and spam detector 508.

As illustrated quickness multiplier 502 is configured to receive spam reports, while karma quickness multiplier 503 is configured to receive not spam reports. As illustrated, karma quickness multiplier 503 may also receive user reputation reports, which may have been included within other spam/not spam attributes' reports, or the like. Such user reputation reports may be usable in weighting not spam reports received from a user. For example, in one embodiment, where a user's reputation indicates that the user might have a high reputation, their inputs might be highly rated. For example, in one embodiment, reputation ratings may range from zero (untrustable) to 100% trustable. Then, in one embodiment, if a user's reputation is above some threshold value, a karma weighting such as 1 might be used for their not spam inputs. However, if the user's reputation is below or at the threshold, then a lower karma weighting might be used, such as 0.5, or the like. In one embodiment, the threshold can be a single value, such as 60%, or the like; however, multiple thresholds, with multiple weighting factors may also be used, without departing from the scope of the invention. In still another embodiment, the weighting factor might be set to a constant value independent of the user's reputation.

Quickness multiplier 502 and karma quickness multiplier 503 are configured to determine a quickness adjustment multiplier (QAM) and karma quickness adjustment multiplier (KQAM), respectively. Quickness multiplier 502 and karma quickness multiplier 503 may employ the reputation report rate prediction table described in FIG. 6 to determine their respective multipliers.

Figure 6:
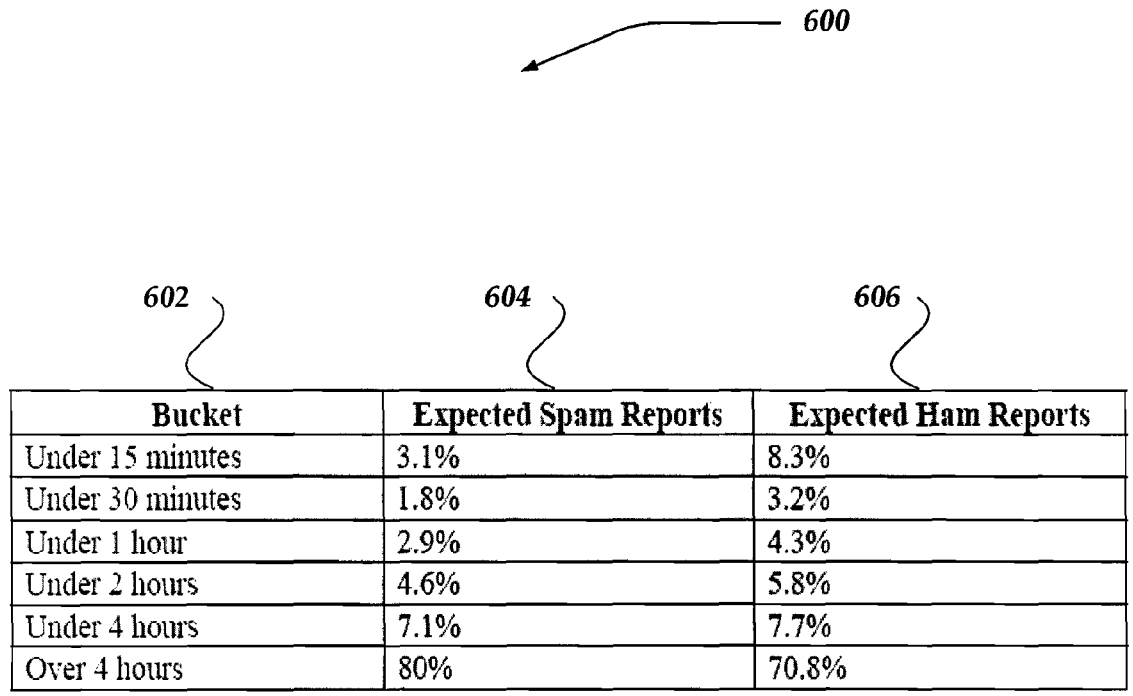
FIG. 6 shows one embodiment of a reputation report rate prediction table usable in rapidly determining a sender's reputation.

Referring to FIG. 6, shown is one embodiment of a reputation report rate prediction table usable in rapidly determining a sender's reputation. Table 600 in FIG. 6 may include many more or less components than those shown. The components shown, however, are sufficient to disclose an illustrative embodiment for practicing the invention. Moreover, although table 600 is illustrated as a table, the invention is not so limited. Thus, reputation report rate predictions may be implemented using any of a variety of other mechanisms, including, without limit to spreadsheets, various database structures, including trees, hierarchies, linked-lists, or the like, folders, an algorithm implemented within an executable application, or the like.

As shown, table 600 includes time buckets 602, percentage expected spam reports 604, and percentage ham (not spam) reports 606 for each time bucket. Table 600 may include more or less time buckets 602 than illustrated. The number of time buckets may be selected based on a variety of criteria, including based on engineering analysis and/or judgment of historical data about how reputations reports from a community of users might be received over time. As shown, the time width of each bucket may be unequal. For example, the first two time buckets (under 15 minutes, and under 30 minutes) have a time width of about 15 minutes, while the third time bucket has a time width of about 30 minutes. It should be clear, however that the time widths for time buckets 602 may be different from that illustrated, based on an analysis of historical data, tuning parameters, or the like. For example, the time widths may each be the same.

Table 600 may be employed to determine a prediction rate for spam reports and/or not spam (ham). For example, assume a single spam report is received after seven minutes. The associated time bucket would be the time bucket for reports received under 15 minutes (the first of time buckets 602). Percentage of expected spam reports 604 for the first time bucket is 3.1% of reports. Similarly, if a single ham report is received at 45 minutes, expected percentage expected not spam reports 606 indicates that 4.3% of ham reports are expected. Table 600 may then be used, in part, to determine quickness adjustment multipliers (QAM and/or KQAM) for spam and not spam reports.

Quickness multiplier 502 and/or karma quickness multiplier 503 may determine the quickness adjustment multipliers using a variety of mechanisms. In one embodiment, however, the quickness adjustment multipliers may be determined as:

Quickness adjustment multiplier (QAM)=(Vote/(Expected % in bucket))/# buckets.

For example, if one spam report is received at seven minutes, then 3.1% of the reports are expected. The QAM is then (1/0.031)/6=5.37. Similarly, if a single ham (not spam) report is received at 45 minutes, and the user reputation associated with the report is 1, then, the Karma QAM (KQAM)=(1/0.043)/6 or 3.88.

The outputs of quickness multiplier 502 and/or karma quickness multiplier 503 may then be sent to spam reporter 504 and not spam reporter 506, respectively. Spam reporter 504 may also be configured to receive a variety of other events, including, but not limited to other spam attributes, inbox volumes, honeypot hits, or the like. Similarly, not spam reporter 506 may receive a variety of other events, including, but not limited to other not spam attributes, address book entries, bulk volumes, or the like.

Spam reporter 504 and not spam reporter 506 may then employ the various inputs to determine virtually in real time a predicted total number of reports for % spam rate and/or % not spam rate for the message sender of interest.

Although any of a variety of mechanisms may be used to predict the number of reports, in one embodiment, the % spam report rate may be determined by spam reporter 504 as:

% Spam report rate=(spam reports*TQAM)+honeypot hits+attributes)/(inbox+honeypot hits+attributes+skew value)

Similarly, the % Not spam report rate may be determined by not spam reporter 506 as:

% Not Spam report rate=(Not spam reports*TKQAM)+Address book entries+Not spam attributes)/(bulk volumes+Address book entries+Not spam attributes)

where the TQAM and TKQAM may represent a total of determined QAM and KQAM values, respectively, for the current and previous time bucket determinations. In one embodiment, the previous QAM and KQAM values may have been stored in a repository, or the like.

As shown above, % spam reports may, in one embodiment, include a skew value, usable to improve predication reaction rates. The skew value may be set to any of a variety of values, and tuned based on a number of resulting false-positives, or other factors. The skew value may initially be set to an initial value, such as a value between 0.5 and 5, and change over time, as a function of another variable, or the like.

The resulting % spam reports and % not spam reports expected may then be provided to spam detector 508, which is configured to employ a sender categorization model to predict whether the message sender is likely to be a spammer. Output of spam detector 508 may include a predication indicating whether the message sender is a spammer, or a non-spammer, or even indeterminate as to whether the message sender is a spammer or not. In one embodiment, spam detector 508 may receive a variety of other input (not shown), to attempt to further determine whether the message sender is a legitimate sender. Such information might include, for example, network addresses that are known spammers, or known as legitimate senders. Such information might be obtained from a variety of sources, including, but not limited to additional feedback from trusted users, organizations, companies, or the like. In any event, the results may be sent to another component, such as antispam responder 312 of FIG. 3 to perform various preventative actions where a message sender is determined to be a spammer.

Figure 7:
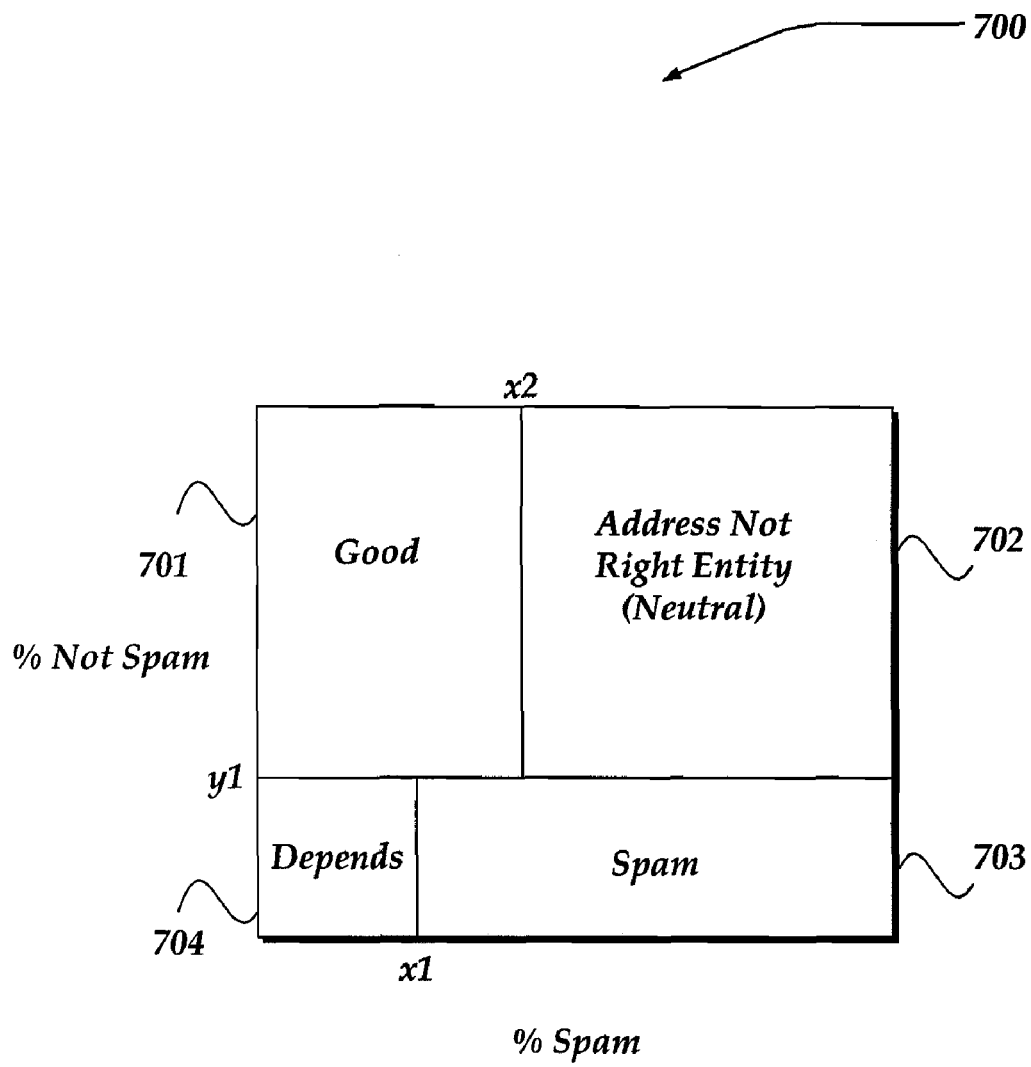
FIG. 7 shows one embodiment of a sender categorization model usable in rapidly determining a sender's reputation.

Spam detector 508 might employ a sender categorization model to predict whether the message sender is a spammer. One embodiment of such a sender categorization model usable in rapidly determining a sender's reputation is illustrated in FIG. 7. Thus, referring to FIG. 7 shown is model 700 that is designed as one embodiment of a graphical model usable to predict whether the received spam and/or not spam reports indicates that message sender for which the reports describe is likely to be a spammer. It should be understood however, that the invention is not constrained to such a model representation for predicting a reputation of a message sender. For example, mathematical equations, spreadsheets, probability curves, or the like, may also be employed, without departing from the scope of the invention.

In any event, the y-axis of model 700, may represent a percent (%) not spam reports, while the x-axis represents percent (%) spam reports. Model 700 illustrates four quadrants, 701-704; however, the quadrants need not include the same amount of area. For example, quadrants 703-704 may be divided at the x1 position on the x-axis, while quadrants 701-702 may be divided at a different position, x2. In one embodiment, x1 may be the same as x2, based on statistical analysis, analysis of historical data, a desired type I error (false-positives), or the like. Similarly, while y1 establishes a height for the quadrants, in another embodiment, quadrant 703 may have a different height than quadrant 704. Values for x1, x2, and y1 may also vary over time, based on changes in the historical data, changes in the desired type I errors, or the like. In one embodiment, x1 and x2 may be determined to be around 5%, while y1 may be initially set to around 1%.

As shown, if a predicted reputation for a message sender results in a value that falls within the area defined by quadrant 701, it is predicted that the message sender is a good or non-spammer. However, if the predicted reputation for the message sender results in a value that falls within the area defined by quadrant 703, then it is predicted that the message sender is a spammer.

If, h the predicted reputation for the message sender results in a value that falls within the area defined by quadrant 702, it is likely that the currently identified network address for the message spammer does not properly identify the message sender. Values within this quadrant tend to indicate a mix of high false positives and spam. This may arise for example, where the message sender is behind another device that modifies the message sender's network address, such as a NAT, ESP, proxy, or the like. Thus, in one embodiment, one approach might be to determine that the reputation of the message sender (spammer or non-spammer) is indeterminate. In one embodiment, this message sender might be ignored. However, in another embodiment, a prediction that the message sender is a spammer might be made. Then, when a plurality of trusted users provides additional feedback as to reputation of the message sender, the invention may modify its prediction. In another embodiment, additional inputs may be used to determine if the message sender is legitimate. Then if it is legitimate, messages from the sender may be allowed to be received by the user community; otherwise, in one embodiment, the messages for a non-legitimate sender might be blocked, or the like.

If the predicted reputation for the message sender results in a value that falls within the area defined by quadrant 704 it may be determined that there may not be sufficient information about the message sender. Such area indicates a low amount of spam reports and a low amount of not spam reports about the message sender. In this situation, in one embodiment, the message sender may be initially identified as a non-spammer. Then, as more reports are received, the prediction of the reputation of the message sender may be updated.

Model 700 may be configured for different conditions, such as low volume messages and high volume messages. Moreover, in one embodiment, a multi-model implementation might be expressed in terms of an algorithm. For example, if it is determined that the bulk volume plus the inbox volume is below some defined value then, the following calculations may be performed. The defined value may be configurable based on a variety of factors, including engineering judgment, or the like. In one embodiment, the defined value may be set initially to 10,000. However, other values may also be used. If any event, if the bulk volume plus the inbox volume is below some defined value, then in one embodiment, a reputation may be determined from the following:

if (% not spam>y1 && % spam≦x2) then in results in quadrant 701 (good);
if (% not spam>y1 && % spam>x2) then in results in quadrant 702 (neutral);
if (% not spam<y1 && % spam≧x1) then in results in quadrant 703 (spam);
if (% not spam<y1 && % spam<x1) then in results in quadrant 704 (depends);

However, if the bulk volume plus the inbox volume is at or above the defined value then, the reputation might be determined, in one embodiment, from the following:

if (% not spam>y1 && % spam≦x2) then in results in quadrant 701 (good);
if (% not spam>y1 && % spam>x2) then in results in quadrant 702 (neutral);
if (% not spam<y1 && % spam≧x1) then in results in quadrant 703 (spam);
if (% not spam<y1 && % spam<x1) then:
   if (bulk volume≧inbox volume) then is spam;
   if (bulk volume<inbox volume) then is good.

It should be noted that while in one embodiment, the model may employ the same x1, x2, and y1 values for high volumes and low volumes, the invention is not so constrained. Thus, in one embodiment, different x3, x4, or y2 values may be used for high volume reporting, than for low volume reporting.

Generalized Operation

Figure 8:
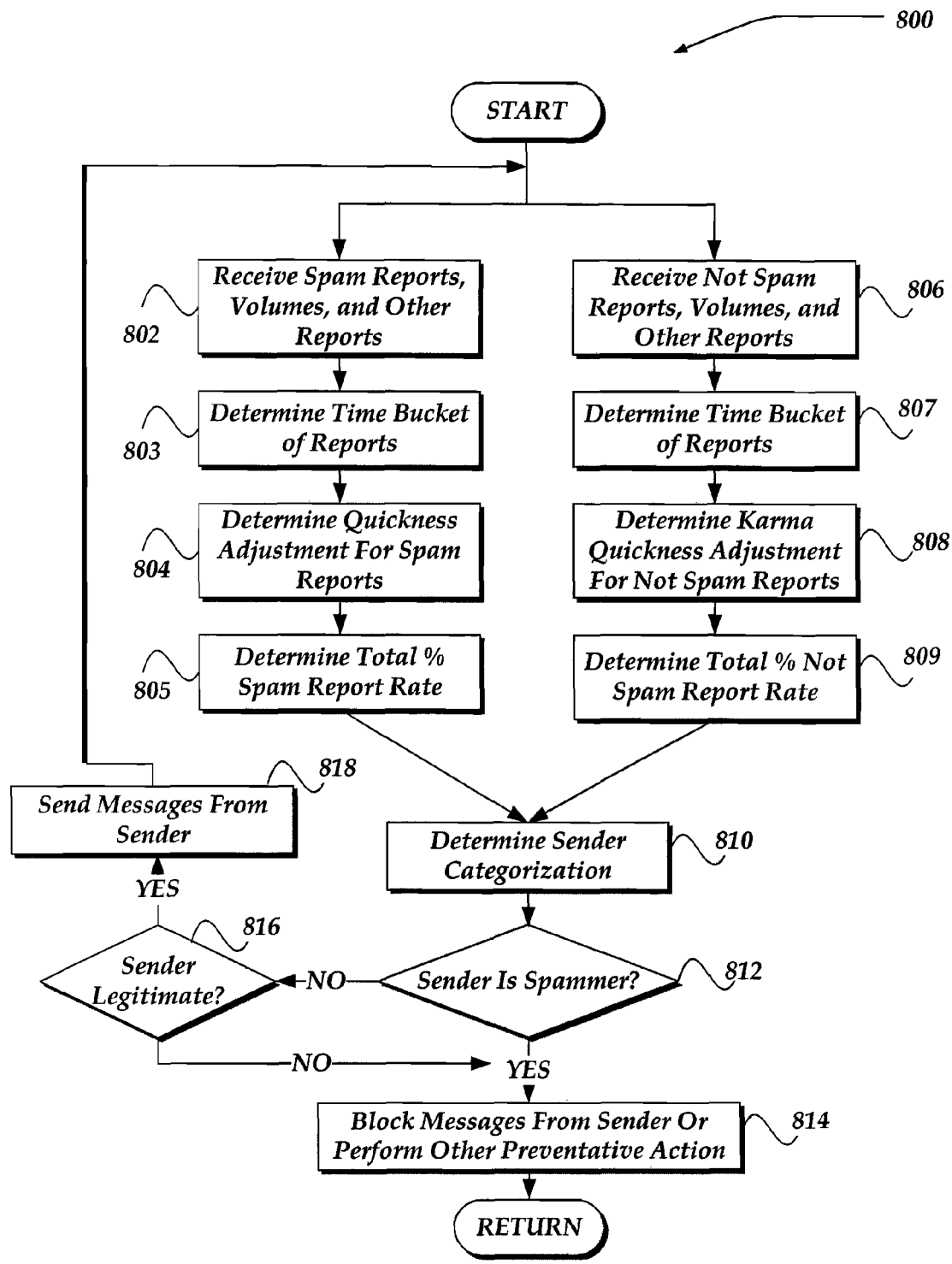
FIG. 8 illustrates a flow diagram generally showing one embodiment of an overview of process usable in rapidly determining a sender's spam/not spam reputation, in accordance with the invention.

The operation of certain aspects of the present invention will now be described with respect to FIG. 8. FIG. 8 illustrates a flow diagram generally showing one embodiment of an overview of process 800 usable in rapidly determining a sender's spam/not spam reputation, in accordance with the invention. In one embodiment, process 800 may be implemented within SRS 106 of FIG. 1.

As shown, process 800 illustrates concurrently flows of computational blocks (802-805 and 806-809). It should be recognized, however, that while these blocks may be performed concurrently, the invention is not so constrained. For example, the blocks may also be performed sequentially (802 through 809), or the like, without departing from the scope of the invention.

In any event, as shown, process 800 begins, after a start block, when various events are received, such as spam reports, volume reports for inboxes, volume reports for bulk messages, and/or other reports, such as described above. Blocks 802 and 806 may then execute based on the type of events received.

Block 802 is arranged to receive spam reports, inbox volume reports, honeypot hits, attribute reports, and the like. Similarly, block 806 is arranged to receive not spam reports, bulk volume reports, address book entries, attributes, and the like.

Moving next from block 802, to block 803, and similarly from block 806 to block 807, a time bucket is determined as described above for the received reports. In one embodiment, blocks 803 and 807 are substantially identical blocks, and may operate to determine a same time bucket. However, the invention is not so limited, and different time buckets may be determined for reports received at block 803 versus reports received at block 806.

Process 800 flows next from block 803 to block 804 where a quickness adjustment multiplier is determined for the current time bucket. In addition, a total of quickness adjustment multipliers (TQAM) is determined by summing the previous QAMs with the current QAM. Processing flows next to block 805.

Similarly, process 800 flows from block 807 to block 808, where a karma quickness adjustment multiplier is determined for the current time bucket. In addition, a total of karma quickness adjustment multipliers (TKQAM) is determined by summing the previous KQAMs with the current KQAM. Processing flows next to block 809.

At block 805 a total % spam report rate is determined as described above. Similarly, at block 809, a total % not spam report rate is also determined. Processing then proceed from both blocks 805 and 809 to block 810, where a message sender is categorized using the sender categorization model such as described above in conjunction with FIG. 7.

Processing flows next to decision block 812 where a determination is made whether the message sender is determined to be a spammer. If so, processing flows to block 814, where messages from the message sender may be blocked from being received by recipients. In one embodiment, a variety of other actions may also be performed, including, for example, generating filters to block messages with similar network addresses as the message sender, sending an alert to users, or the like. Processing then returns to a calling process to perform other actions.

If, however, at decision block 812, it is not determined that the message sender is a spammer, processing flows to decision block 816. In this situation, the message sender may have been determined to be an allowable (good) message sender. However, it may also be the case that the network address does not properly identify the message sender, or there might not be sufficient information about the message sender to predict the message sender's reputation. Thus, at decision block 812, additional information about the message sender might be employed to attempt to determine if the message sender is legitimate. For example, if the network address is associated with a NAT, ESP, proxy, or the like, that is known to be a legitimate sender of messages, this message sender might also be legitimate. In any event, if it is determined that the message sender is legitimate, processing flows to block 818, where the message sender's messages are allowed to continue to be sent to the user community. Processing then flows back to blocks 802 and/or 806 to repeat the steps for each message sender.

If, at decision block 816, the message sender is not determined to be legitimate, processing flows to block 814, where the message sender's messages may, in one embodiment, be blocked, or otherwise prevented from being sent to the user community.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause operational steps to be performed by the processor to produce a computer implemented process such that the instructions, which execute on the processor to provide steps for implementing the actions specified in the flowchart block or blocks. In one embodiment, at least some of the operational steps may be performed serially; however, the invention is not so limited, and at least some steps may be performed concurrently.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Alternative Asynchronous Aggregation Platform Applications

It should be noted that the above described real time asynchronous aggregation platform may be employed for determining reputations for a variety of other application beyond that of a bulk message sender. For example, the real time asynchronous aggregation platform may be employed to determine reputations for movies, authors of blogs, or other articles, cars, or any of a variety of a target of interest.

Therefore, in a more general context, events such as described above, may be represented generally by a reputation statement. A reputation statement may typically include an action by a source, such as a user, that submits values in a particular context for a target, such as a user generated content or product. Statements may be sent asynchronously to the real time asynchronous aggregation platform. A reputation engine within the real time asynchronous aggregation platform may then process the statement by calculating a target's reputation score and storing the result in a reputation repository; the events may also be optionally stored as well.

In the statement, in one embodiment, a method parameter may be included that specifies which model and/or method in the engine will do the processing. In one embodiment, a reputation statement may describe an event as a source, such as a user, makes a value judgment, or claim, about a target, such as a product or some user generated content. For example, in one embodiment, user "A" (the source) give 4 out of 5 stars (the claim) to the movie XYZ (the target).

The reputation engine, in one embodiment, such as described above, combines, or rolls up the claim values to determine the target's reputation score for each of its reputation attributes. The model may then, in one embodiment, define a formula, or the like, and which reputation attributes to update for the target.

Moreover, in one embodiment, a reputation statement may include several types of claims, including, but not limited to quantitative, normalized, or composite. A quantitative claim may assign a numeric value to the target. A normalized claim might assign a numeric value within a specified range, while a composite claim may assign two or more key value pairs to a target. For example, price=1, service=3, or the like.

In any event, the reputation engine may be configured to receive a reputation statement including one or more of the above types of claims, and to operate in real time upon the received reputation statements to determine a reputation for the target. Thus, the real time asynchronous aggregation platform may be employed for a large variety of different reputation applications, or the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for selectively managing delivery of messages over a network, comprising: a transceiver to send and receive data over the network; and a processor that is operative to perform actions, including: receiving, from a user, a spam report indicating that a message sender is sending spam; determining a time in which the spam report is received; determining a total percent expected spam report rate based in part on the received spam report and the time using in part a reputation report rate prediction mechanism comprising a plurality of time buckets, each time bucket representing an expected percentage of spam reports to be received within a given time period; using the total percent expected spam report rate to statistically categorize a reputation of the message sender; and if the message sender is categorized as a spammer, performing an action to prevent another message being sent to the user from the message sender.

2. The network device of claim 1, wherein the processor that is operative to perform actions, further comprises: receiving a not spam report indicating that the message sender is not sending spam; determining a total percent expected not spam report rate based in part on the received not spare report and the time; and employing the predicted total number of not spam reports to further statistically categorize the reputation of the message sender.

3. The network device of claim 1, wherein statistically categorizing the reputation further comprises: determining a quickness adjustment multiplier based on a time bucket associated with the time in which the spam report is received, and an expected percentage of spam reports for the time bucket in the plurality of time buckets.

4. The network device of claim 1, wherein the processor that is operative to perform actions, further comprises: receiving a inbox volume indicator for a number of messages in the user's inbox; determining a percent spam report rate based on a ratio of total percent expected spam report rate to the inbox volume; and statistically determine whether the percent spam report rate indicates if the message sender is likely to be a spammer.

5. The network device of claim 1, wherein the processor that is operative to perform actions, further comprises: if the statistical categorization of the message sender indicates that the message sender is likely to have a good reputation, allowing additional messages to be sent by the message sender to the user.

6. The network device of claim 1, wherein the processor that is operative to perform actions, further comprises: if the statistical categorization of the message sender indicates that a network address identified with the message sender may not be an actual network address of the message sender, employing additional network address information to further categorize the reputation of the message sender.

7. The network device of claim 1, wherein the processor that is operative to perform actions, further comprises: receiving additional reports including at least one of a honeypot hit report indicating receiving of messages from the message sender at a fake mailing address, a bulk volume report, a not spam report, or a address book entry report; and employing the additional reports to further statistically categorize the reputation of the message sender.

8. A method for use in managing delivery of content over a network, comprising: receiving, from at least one user, at least one spam report indicating that a message sender is sending spam; receiving a number indicating an inbox volume for the at least one user; determining a time in which the at least one spare report is received; determining a quickness multiplier associated with the at least one spam report and the time; determining a total percent expected spam report rate using the quickness multiplier, inbox volume, and the at least one spam report; using the total percent expected spam report rate to statistically categorize a reputation of the message sender; and if the message sender is categorized as a spammer, performing an action to prevent another message being sent to the user from the message sender.

9. The method of claim 8, further comprising: receiving, from at least one other user, at least one not spam report indicating that a message sender is not sending spam;
  receiving a reputation report that provides a reputation rating for the at least one other user sending the at least one not spam report; determining a karma quickness multiplier associated with the at least one not spam report, the reputation report, and the time; determining a percent ham report rate based in part on the karma quickness multiplier, and the at least one not spare report; and modifying the categorization of the reputation of the message sender based on the percent ham report rate.

10. The method of claim 9, further comprising: receiving at least one address book entry report indicating that the message sender is known by the at least one user; and employing the at least one at least address book entry report to modify the percent ham report rate.

11. The method of claim 8, wherein determining the quickness multiplier further comprises: determining a number of time buckets for receiving determining a number of time buckets for receiving reputation reports, including spam reports; determining a percentage of expected spam reports to be received for each of the time buckets; determining the quickness multiplier by determining a ratio of received at least one spam reports to percentage of expected spam reports for the determined time to the number of time buckets.

12. The method of claim 8, further comprising: if the statistical categorization of the message sender indicates that the message sender is likely to have a good reputation, allowing additional messages to be sent by the message sender to the user; and
  if the statistical categorization of the message sender is indeterminate based in part on a insufficient number of spam reports, and not spam reports, deferring categorization of the message sender, and enabling an additional message to be received by the at least one user from the message sender.

13. The method of claim 8, using a sender categorization model to statistically categorize the message sender's reputation into at least one or a spammer, not a spammer, indeterminate, or that the message sender's network address improperly identifies the message sender.

14. The method of claim 8, further comprising: receiving at least one honeypot hit report indicating that the message sender has sent at least one message to a fake email address; and employing the at least one at least one honeypot hit report to modify the total percent expected spam rate.

15. A system for use in selectively enabling delivery of content over a network, comprising: a dispatcher service configured to receive a plurality of events associated with a reputation of a message sender; a sender reputation engine that is configured to receive the plurality of events and to perform actions, including: determining a quickness multiplier based on a received number of spam reports received in the events for a given time; determining a total percent expected spam report rate about the message sender based on the received events and the quickness multiplier; using the total percent expected spam report rate to statistically categorize a reputation of the message sender; and if the message sender is categorized as a spammer, performing an action to prevent another message being sent to the user from the message sender.

16. The system of claim 15, wherein the sender reputation engine is configure to perform actions, further comprises: determining a karma quickness multiplier based on a received number of not spam reports received in the events for a given time; determining a total percent expected not spam report rate about the message sender based on the received events and the karma quickness multiplier; and using the total percent expected not spam report rate to modify the categorization of the reputation of the message sender.

17. The system of claim 16, further comprising: receiving at least one address book entry indicating that a user knows the message sender as other than a message spammer; and employing the at least one address book entry to modify the total percent expected not spam report rate.

18. The system of claim 15, wherein the received events further comprises at least one of a honeypot hit report indicating if the message sender has sent a message to a fake message address, and employing the honeypot hit report to modify the total percent expected spam report rates.

19. The system of claim 15, wherein determining a total percent expected not spam report rate further comprises employing an inbox volume report to determine a total percent expected not spam report rates for the message sender.

20. The system of claim 15, determining a quickness multiplier further comprises further employing a percentage expected spam report for a given time to determine the quickness multiplier.

* * * * *

UNITED STATES PATENT AND TRADEMARK OFFICE
CERTIFICATE OF CORRECTION

| | | |
|---|---|---|
| PATENT NO. | : 7,937,468 B2 | Page 1 of 1 |
| APPLICATION NO. | : 11/774460 | |
| DATED | : May 3, 2011 | |
| INVENTOR(S) | : Miles Libbey et al. | |

It is certified that error appears in the above-identified patent and that said Letters Patent is hereby corrected as shown below:

In column 19, line 41, in Claim 2, delete "spare report" and insert -- spam report --, therefor.

In column 20, line 19, in Claim 8, delete "spare report" and insert -- spam report --, therefor.

In column 20, line 37, in Claim 9, delete "spare report;" and insert -- spam report; --, therefor.

In column 20, lines 46-47, in Claim 11, after "comprises:" delete "determining a number of time buckets for receiving".

In column 21, line 6, in Claim 14, after "employing the" delete "at least one".

Signed and Sealed this
Third Day of January, 2012

David J. Kappos
*Director of the United States Patent and Trademark Office*